Patented Jan. 14, 1930

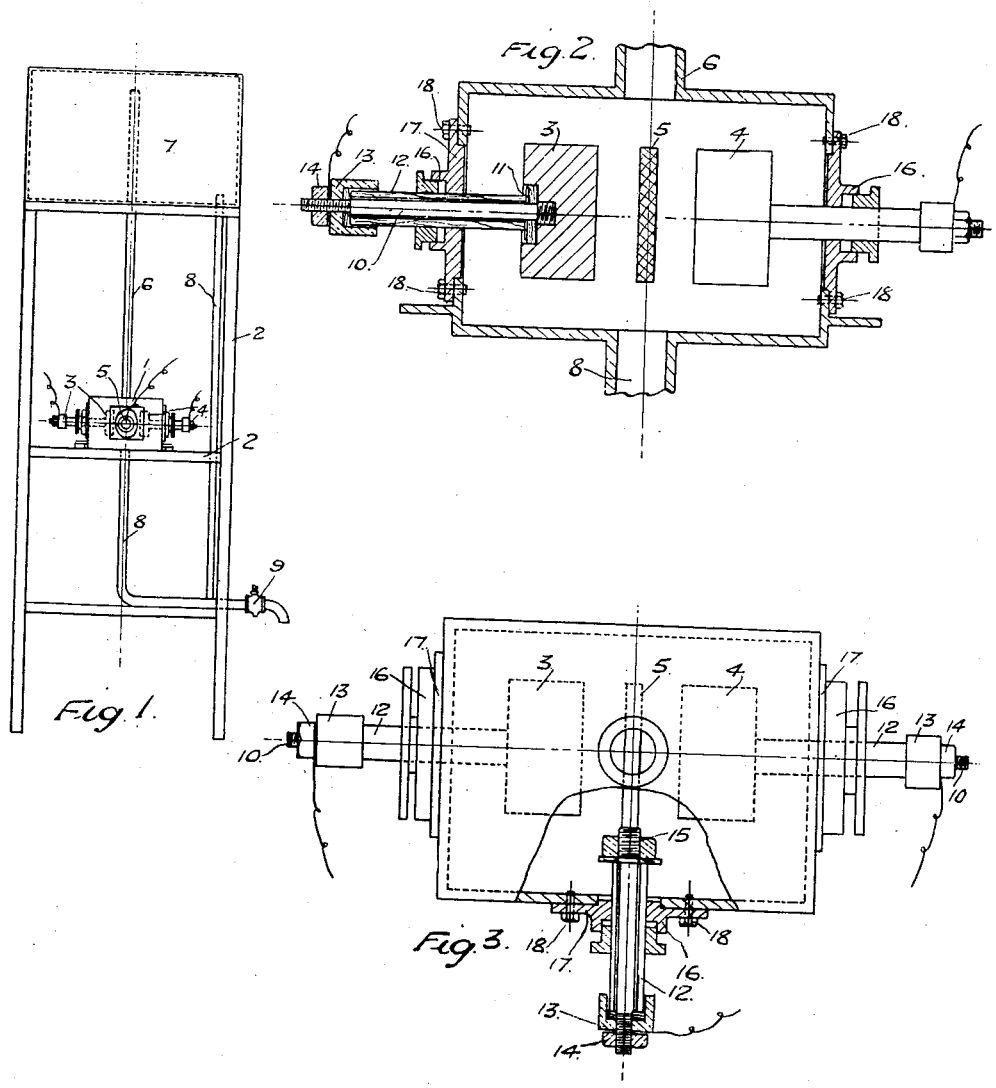

1,743,186

UNITED STATES PATENT OFFICE

RAOUL FELICE BOSSINI, OF LONDON, ENGLAND

ELECTROLYTIC RECTIFIER FOR ALTERNATING CURRENTS

Application filed July 7, 1925, Serial No. 42,070, and in Great Britain July 17, 1924.

My invention relates to improvements in electrolytic rectifiers for alternating currents and has for its object the provision of apparatus for rectifying currents of large amperage.

In carrying out this invention I provide an apparatus which effects the continuous circulation of the electrolyte between and around the electrodes of a valve of the Noden type. The electrodes are fixed in a box of small capacity, to which box two pipes are connected at the top and bottom respectively, the one for the outflow of the heated electrolyte and the other for the inflow of the cooled electrotype. These two pipes form part of a thermo-siphon system. The liquid rises through the upper pipe to an elevated tank, which serves the purpose of a storage tank, and also acts as a cooling tank for the heated liquid. The upper pipe passes through the bottom of the tank to a certain height, but the open upper end thereof must always be kept submerged in the liquid. From the bottom of the tank descends the return pipe, which is so bent at its lower end as to connect under the bottom of the valve-box. A draw-off cock 9, for deposit, is connected to the bend or lower portion of the siphon system as shown in Figure 1.

In my apparatus I rectify the two half waves of one period of an alternating current. To obtain this result I use three electrodes, one positive and two negative, connected to the secondary coils of a transformer. The electrodes are connected to a compound secondary so constructed as to avoid any tension between the two negative electrodes.

The invention demonstrates that the resistance of a Noden valve is due not only to the electrolyte or the effect of the electrolyte on the electrodes, but also and principally to the heat of the liquid film between the electrodes. In existing apparatus of this class a fall of 30 volts in the potential is usual, whilst in my apparatus this fall in the potential is reduced to 4 to 6 volts, giving an efficiency never hitherto attained.

The corrosive effect of the electrolyte on the aluminum or other plates is practically nil in my apparatus and this, I claim, is due to the fact that my design enables the electrodes to be completely immersed in the liquid.

The gas produced on the electrodes mingles with the ascending column of heated liquid and materially assists the circulation of the latter.

The three electrodes are connected to a transformer which has one primary and two secondary windings. The design and construction of this transformer, the method of connecting the same to the electrodes of the rectifier and the further application of the transformer to rectifiers of other classes, form the subject of another application for Letters Patent and are fully described and illustrated in the complete specification attached to that application and forming no part of this invention.

In the accompanying drawings:

Fig. 1 is an elevation showing general arrangement of my apparatus.

Fig. 2 is a sectional elevation of the electrode-box.

Fig. 3 is a plan of the same, partly in section.

Referring to the drawings, in Fig. 1, 1 represents the electrode-box, which is supported on the frame 2 in any suitable manner. The electrode-box 1 contains three electrodes 3, 4 and 5, 3 and 4 being the cathodes and 5 the anode, and each separate from the others and insulated from the electrode-box 1. To the upper part of the electrode-box 1 there is suitably connected the flow pipe 6, the top end of which is open and rises to the upper part of the cooling tank 7.

The cooling tank 7 is suitably supported on the frame 2 at a point higher than the electrode box and is insulated from the frame. From the bottom of the cooling tank 7 the return pipe 8 descends to a point below the electrode-box where it is bent upward and is connected to the bottom of the said box, to discharge thereunto. The draw-off cock connected to the pipe 8 is indicated at 9 and enables deposit to be disposed of.

The cathodes 3 and 4 are each composed of a piece of aluminum rod. These rods are each recessed in the center and smaller rods 10 are secured thereto as shown. Insulating tubes 12 are passed over the rods 10 and are provided at their inner ends with packing 11 and at their outer ends with caps 13 through which threaded reduced outer extremities 10ª of the rods 10 extend. Nuts 14 are threaded on said extremities, several in connection therewith to compress the packings 11 and also several, in connection with the caps 13 to bind the conducting wires as shown. Hence contact of the electrolyte with the rods 10 is prevented and said rods are prevented from corroding. The caps 13 are also provided with packing to prevent filtration of liquid.

The anode 5 is composed of lead or iron plate, held by the rod 15 and is insulated and held in place by a similar means as that described in connection with the cathodes. 16 are stuffing-boxes, which prevent leakage of the electrolyte and are formed in the cover plates 17, which said cover plates form doors on the side of the electrode-box and are secured by studs 18.

The connections of the three electrodes come from a transformer, which comprises one primary and two secondary windings. The two secondary windings are so arranged as to prevent any tension between the two negative electrodes, providing one tension only between the anode 5 and the two cathodes 3 and 4. By this arrangement any loss or leakage of current is avoided, thus the greatly improved efficiency of the apparatus is obtained. This is secured without the use of any choke coil or other electrical fitting in addition to the transformer.

The operation of the apparatus is as follows:—

The internal resistance of an electrolytic rectifier is mainly due to the heat generated in the electrolyte by the passing of the current. In my apparatus, when the current passes from the anode 5 to one of the cathodes 3 or 4 in each half cycle of a period of an alternating current, the electrolyte, which fills the electrode-box, the pipes 6 and 8 and the tank 7, will be heated, and because of the arrangement of these parts already described, a continuous circulation of the electrolyte between the electrode-box and the tank will be set up. The cool liquid from the tank will constantly replace the heated liquid in the electrode-box and by this thermo-siphonic action the liquid in the electrode-box will be continually renewed and maintained at a low temperature.

The result of maintaining this low temperature in the electrode-box is that the corrosion of the aluminum electrodes is reduced to a minimum and the chemical composition of the electrolyte remains unaffected.

I claim—

In apparatus of the class described, an electrode box having an opening and a packing box in one of its walls, an electrode in said box having a conductor rod extending through said opening and packing box and also having a tubular insulating member through which said rod extends, said insulating member also extending through said opening and packing box and a cap at the outer end of the tubular insulating member, said rod having a threaded outer extremity and a nut thereon, said nut bearing against said cap and causing the latter to force the inner end of the insulating tubular element against a packing with which a surface of the electrode is provided so that telectrolyte is prevented from coming in contact with the conductor rod.

In witness whereof I affix my signature.
RAOUL FELICE BOSSINI.